United States Patent
Brandsma et al.

(10) Patent No.: US 7,066,859 B2
(45) Date of Patent: Jun. 27, 2006

(54) BELT

(75) Inventors: Arjen Brandsma, Tilburg (NL); Johannes Hendrikus Van Lith, Berlicum (NL); Cornelis Johannes Maria Van Der Meer, Tilburg (NL)

(73) Assignee: Van Doorne's Transmissie B.V., Tilburg (NL)

( * ) Notice: Subject to any disclaimer, the term of this patent is extended or adjusted under 35 U.S.C. 154(b) by 0 days.

(21) Appl. No.: 10/972,471

(22) Filed: Oct. 26, 2004

(65) Prior Publication Data

US 2005/0059519 A1 Mar. 17, 2005

Related U.S. Application Data

(62) Division of application No. 10/088,118, filed as application No. PCT/EP00/09101 on Sep. 14, 2002, now Pat. No. 6,830,525.

(30) Foreign Application Priority Data

Sep. 15, 1999 (EP) .................................. 99203013

(51) Int. Cl.
*F16G 5/16* (2006.01)
*F16H 5/22* (2006.01)

(52) U.S. Cl. ...................................... 474/242; 474/201
(58) Field of Classification Search ................ 474/201, 474/237, 240, 242, 243–247, 265, 272
See application file for complete search history.

(56) References Cited

U.S. PATENT DOCUMENTS

| 3,720,113 | A | | 3/1973 | Van Doore et al. |
| 4,526,561 | A | * | 7/1985 | Hattori ........................ 474/242 |
| 4,579,549 | A | | 4/1986 | Okawa et al. |
| 4,787,961 | A | | 11/1988 | Rush |
| 6,123,637 | A | | 9/2000 | Yagasaki |
| 6,217,472 | B1 | * | 4/2001 | Fujioka et al. ............... 474/242 |
| 6,334,830 | B1 | | 1/2002 | Yagasaki et al. |
| 6,440,023 | B1 | | 8/2002 | Kanehara et al. |

FOREIGN PATENT DOCUMENTS

| EP | 61017743 | | 1/1986 |
| EP | 62028548 | | 2/1987 |
| EP | 62118928 | | 5/1987 |
| EP | 04321845 | | 11/1992 |
| EP | 10169719 | | 6/1998 |
| EP | 11101312 | | 4/1999 |
| EP | 0 922 884 A2 | | 6/1999 |
| JP | 62-28548 | * | 2/1987 ................. 474/237 |
| JP | 10-169720 A | | 6/1998 |
| JP | 2001-153607 A | | 6/2001 |
| JP | 2003-120758 A | | 4/2003 |

* cited by examiner

*Primary Examiner*—Marcus Charles
(74) *Attorney, Agent, or Firm*—Young & Thompson

(57) ABSTRACT

A continuous variable transmission belt includes a set of nested metal rings, the set interacting with transverse elements provided slidably along the set, and the rings of the set being accommodated with small mutual play between each pair of adjacent rings, where for at least the majority of the pairs of adjacent rings the nominal value of the play is zero. The innermost and outermost rings having an elasticity modulus significantly lower than the intermediate rings.

18 Claims, 2 Drawing Sheets

BELT

CROSS REFERENCE TO RELATED APPLICATIONS

This application is a division of application Ser. No. 10/088,118 filed on Mar. 15, 2002, and issued as U.S. Pat. No. 6,830,525, the entire contents of which are hereby incorporated by reference.

BACKGROUND OF THE INVENTION

The present invention relates to a belt for use in a Continuously Variable Transmission.

DESCRIPTION OF RELATED ART

Such a belt is generally known, more in particular from the U.S. Pat. No. 3,720,113. Belts satisfying the described characteristics mentioned in this document are known in practice, and prove to perform satisfactorily. The set of rings shown by such belts will be described as adjacent rings, alternatively denoted hoops or strips, and adjacent meaning directly adjacent, in other words such that mutual abutment may take place between adjacent rings in a set.

Despite the known belt is at present commercially available for more than a decade, and is technically known for even many more years, it is in practice still found that the endurance time of belts may still be significantly improved.

SUMMARY OF THE INVENTION

It is therefor an object of the invention to enhance durability of the known belt while maintaining and preferably improving the power transmitting capacity of the known belt. According to the present invention this may in a surprisingly simple manner be achieved by that described below.

A problem underlying the invention is how to determine one or more specific features of a belt related to the endurance thereof. One such feature is suggested by U.S. Pat. No. 4,579,549, teaching that the innermost ring, alternatively denoted hoop, is subjected to the biggest tensile stress of all the hoops. Decrease of tensile stresses of the innermost hoop is mentioned to enhance the service life thereof and therewith of the belt. For achieving such, the document further indicates the hoops of a set to be "superimposed with no clearance between abutting hoops". This indication is in the document explained to mean that each of the hoops has an outer circumferential diameter adapted to be equal to, or larger than, an inner circumferential diameter of an abutting outer hoop. The technical effect of such measure is suggested to be that the tensile stresses of the hoops increase with the increase in diameter thereof. This measure is further explained to be found as an inverse or opposite effect found at prior art belts "which have clearances of 30 μm between abutting hoops", and which prior art belts featured a decreasing tensile stress with an increasing diameter of the respective rings. It is here remarked that the latter prior art feature fits the teaching of above mentioned earlier publication U.S. Pat. No. 3,720,113 in that practically no play could include a play of 30 μm for as far as belts of a dimension within the range for regular automotive application are concerned.

A confirmation of the teaching of above mentioned publication U.S. Pat. No. 4,579,549 is provided by the recent publication of Japanese patent abstract No. 10169719 of application No. 08332187. In this publication the rings of a set are indicated to require a likewise so called minus clearance or, alternatively denoted, a negative play.

Both abstract and U.S. Pat. No. 4,579,549 suggest the characteristic of play between rings of a set to be important in relation to life time of a belt. These documents however provide a measure effecting a confusingly inverse effect on distribution of belt tension in the rings of a set.

As to U.S. Pat. No. 3,720,113, when interpreted with the teaching of U.S. Pat. No. 4,579,549, pointing to play between rings, it is found that rings of the first known belt "are super imposed with practically no play." For a practical implementation and for use as a starting point for improvement, this indication is too vague. An obvious interpretation of this teaching however, would be to utilise the inverse expression, indicating that the rings are superimposed with some play, be it practically absent. Belts of this nature are likely to show the distribution of tensile stresses conforming to the distribution shown as prior art in U.S. Pat. No. 4,579,549, i.e. will have highest tensile stress at the innermost ring. Adopting the solution of the latter U.S. Pat. No. 4,579,549 document, it is unsatisfactory found that this solution leads to still one weakest ring, however, now located at the outermost side of a ring set.

The present invention overcomes the drawbacks of all prior art by prescribing a play of nominal value zero. In this way an even distribution of ring stress over at least the majority of the rings of a set is effected, realising a balanced transfer of tensile stress between each relevant ring. Moreover, the level of tensile stress so realised in any ring of a set is significantly lower than that in the ring with highest tensile stress in any of both known solutions. It will be found that with a belt according to the invention the life time of a belt is increased to such extend that durability may with impunity be exchanged against the level of torque to be transmitted, e.g. the effect may be utilised by applying the essentially same belt in environments with higher torque to be transmitted. Should all pairs of rings be accomodated with play of nominal value zero, it will be found that life time is enhanced in respect of belts with any above mentioned prior art measure, not in the last instance because belts are in practice found to fail either through failure of the innermost ring or through failure of the outermost ring.

In order to reproduce the above effect in a sufficiently consistent and reliable manner a favoured embodiment according to the invention requires that the nominal value of zero is realised by a tolerance of 0.00005 times the outer diameter of the inner ring of a relevant pair of rings, plus or minus of the diameter. The technical effect of this measure according to the invention is that the differences of lifetime effect will remain within an accepted bandwidth for technically equivalent belts. In further detail of this effect, it will be found that that no significant difference in life time can be remarked as a consequence of this measure, since the effect hereof is that the spread of life time consequence of this measure will normally remain within the natural life time spread caused by metal fatigue.

Yet another preferred embodiment of the invention requires the mutual play between the innermost pair of adjacent rings is of negative value. It is acknowledged by the invention that the innermost ring of a set, as described by U.S. Pat. No. 4,579,549, "is subjected to both tensile forces and frictional forces". However, as indicated below, the measure subsequently taught by the publication is rejected. Rather, the favoured embodiment applies the idea underlying the present invention to solve the problem of the first ring, i.e. to take account of the tension each ring is individually subjected to. Combining this idea with the insight underlying the invention that the innermost ring is subjected to certain forces specific thereto, it was found according to this specific aspect of the invention that the tensile stress should be kept relatively low in order to keep the total level of stress in the innermost ring at a level conforming to the level in remainder of the rings of a set. In this respect it was recognised that the frictional force following from interaction between the innermost ring and the transverse elements as mentioned in U.S. Pat. No. 4,579,549, when compared to frictional force resulting from ring-ring interactions is high, so that an additional frictional force should be calculated with for the innermost ring. At the innermost ring it should further be calculated with so-called Herze tensions resulting from element-ring contact. A favoured manner of keeping the level of tension in the innermost ring at the level of the in-between rings of a set is, according to the invention, to reduce the tensile stress by providing some negative play for the innermost ring only.

In a further advancement of above measure directed to the play of the innermost ring specifically, the invention is further characterised in that the outermost diameter of the innermost ring is of a value (1−Z) times the inner diameter of the adjacent ring, Z being of a value smaller than 0.0008. A technical effect of the so specifically identified range is that the reliability and consistency of the effect of the measure related to the innermost belt is increased, while taking into account further sources of tension specific to the innermost belt, including e.g. so called Herze tensions originating from the element-ring contacts. In this respect the value of greater than 0.0001 effects yet a further enhancement. It will be found that, although the parameter Z to some extent varies with the application of a relevant belt, a belt is stressed in conformance with the in-between ring, thus having a conforming life time, when the parameter Z is kept in the above the range.

A further specific aspect of the invention relates to a belt wherein the mutual play of the outermost pair of adjacent rings is of positive value. The technical effect hereof is that compensation is provided for tension sources other than tensile stress, specific to the outer rings, such that the total tension in the outer ring may be brought into conformance with, i.e. will not be higher than, the tension in the further rings of a set. An insight underlying this aspect of the invention is that a tension source specif to the outer rings is caused by subjection to intense contact with transverse elements, i.e. with the boundary opposite to the so-called saddle part, at the instant where the belt should escape out of the pulley in which it is to be operated. Since the elements are clamped between the sheaves of a pulley, they tend to rotate therewith. For transmitting force to the other pulley however, the belt and the elements should cross to the other pulley. Thus the elements are pulled out of the sheaves at the instance of leaving the pulley, thereby causing intense contact between the so-called ear part of a transverse element and the outermost ring. In a further development of this aspect the inner diameter of the outermost ring is of a value (1+Y) times the outermost diameter of the adjacent ring, Y being of a value smaller than 0.0004 and preferably greater than 0.00005. When the values of this specific range are followed the technical effect indicated at the range for the innermost ring will be further enhanced.

A particular aspect of the invention is characterised in that the thickness of one or both of the innermost and the outermost ring of the set is significantly by less than the nominal thickness of in between rings of the set. The invention therefor also relates to a belt for use in a continuously variable transmission, in particular for automotive application, comprising at least one set of nested metal rings, the set interacting with transverse elements provided slidably along the set, and the rings of the set being accommodated with small mutual play between each pair of adjacent rings, whereby the thickness of one or both of the innermost and the outermost ring of the set is significantly less than the nominal thickness of in between rings of the set. With such a measure the invention provides an alternative means of realising an evenly distributed tension level over the rings of a set. The insight utilised in this invention is that a smaller thickness realises a lower bending stress in the relevant ring thereby lowering the tension level in the innermost and/or outermost ring, allowing the relevant ring to receive tension from sources specific therefor, without penalty in regard of life time.

Yet another particular aspect of the invention relates to the measure wherein the material composition of at least one of the innermost and the outermost ring of the set significantly differs from that of the in between rings of the set, such that the elasticity modulus thereof is significantly lower than that of in between positioned rings. The invention therefor also relates to a belt, for use in a continuously variable transmission, in particular for automotive application, comprising at least one set of nested metal rings, the set interacting with transverse elements provided slidably along the set, and the rings of the set being accommodated with small mutual play between each pair of adjacent rings, whereby the elasticity modulus of one or both of the innermost and the outermost ring of the set is significantly less than the nominal thickness of in between rings of the set. With such a measure get another alternative for realising an evenly distributed tension over all rings of a set is realised. The technical effect is comparable to the preceding alternative.

In a further elaboration of the latter aspects the value for thickness and elasticity modulus of the innermost and the outermost ring is at least twenty percent (20%) less than the average value of the parameters at the in-between rings. When the values of this specific ranges are followed, the technical effect in durability and torque to be transmitted, indicated a.o. at the range for the innermost ring, will be further enhanced.

BRIEF DESCRIPTION OF THE DRAWINGS

The invention will now further be explained by way of examples given in the accompanying drawing wherein.

DESCRIPTION OF THE PREFERRED EMBODIMENTS

Figure 1:
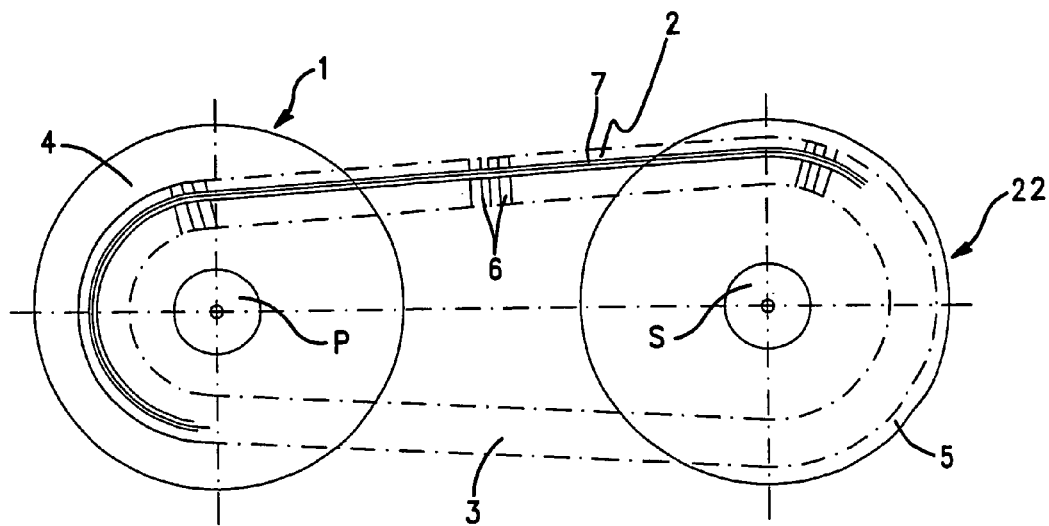
FIG. 1 is a schematic illustration of the belt the present invention relates to, together with the transmission wherein it is to be operated.

FIG. 1 shows schematically a continuous variable transmission (CVT) suitable amongst others for automotive application, with a conveyor belt 1, made up of a carrier in the form of a nested set of endless thin bands 2, otherwise denoted rings 2 and a multitude of separate transverse elements 3, otherwise denoted blocks 3. The elements 3 are arranged freely slidably along the carrier 7 in an endless, virtually continuous series. The carrier 7, alternatively denoted support and ring set is composed of a number of the in endless bands, alternatively denoted loops or rings. For operational application the belt 3 runs within the V-shaped groove of the pulleys 1 and 22 with steplessly variable diameter. Its elements 6 are provided with inclined contact faces for contacting the sheaves 4 and 5 of the pulleys. The pulleys 1 and 22 are provided on shafts P and S respectively. When pinched sufficiently strong between the sheaves of a pulley 1, 22 the belt 3 transmits force from one rotating pulley to the other. The elements 6, as seen in cross section preferably have a lower part of which at least one principle side is inclined relative to the upper part at the same side, so that the element 6 becomes thinner towards the side directed to the inner side of the belt. Such a continuous variable transmission is known per se. The elements 6 further are provided with generally slightly convexely shaped contact faces also denoted saddles for contacting the support 7, in particular the innermost band thereof.

In operation the belt, through the rotation of a driving pulley passes a trajectory with upper and lower predominantly straight parts between the pulleys, and with first and second predominantly circular trajectories, where the belt is clamped by the sheaves of a pulley. In one of the straight parts each time, between the pulley clamped circular trajectories of the belt, the carrier 7 may be subjected to highest tensile forces. In practice the belt in one straight part may become somewhat buckled due to the elements pushing against each other, thereby virtually forming a metal rod between said pulleys, and having the tendency of splashing apart. This tendency however, is counteracted by the carrier 7, which according to the invention in the push is may be subjected to relatively high tensile stresses. However, high tensile stress may depending on the state of the belt, also occur at the opposite straight part where the belt, i.e. the carrier 7, is subjected to high pulling force.

Figure 2:
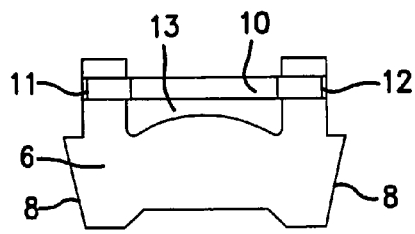
FIGS. 2 and 3 by way of cross sections indicate transverse elements for two of many possible types of belt that may be provided with the features of the invention.
Figure 3:
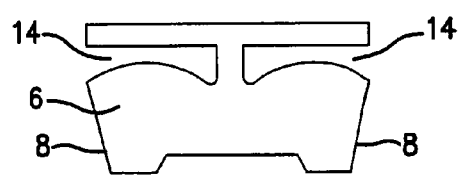

FIGS. 2 and 3 show possible embodiments of a transverse element 6. FIG. 2 depicts a so called single package element having a central opening 13 for receiving a ring package, alternatively denoted set of rings 7. The opening is bounded to its upper side by a removable closure element 10, e.g. embodied by a pin. The pin 10 is received by opening 11 and 13 respectively, provided in upwardly parts of the element defining the opening 13. In a lower part thereof, each element is provided with side faces 8 for contacting the side faces the respective sheaves of a pulley in a matching plane.

FIG. 3 depicts an embodiment for receiving dual ring sets 7, for which purpose two ring receiving slots 14 are provided. Each slot 14 are provided. Each slot 14 has a lower saddle part and an upper boundary provided through an upper T-shaped element part.

Figure 4:
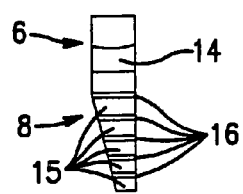
FIG. 4 is a side elevation of the cross elements according to FIGS. 2 and 3.

FIG. 4 shows the contact face 8 to be roughened in the depicted example, embodied by rills 16 and grooves 15, so as to allow passage of a cooling medium such as transmission oil. FIG. 4 further shows the elements 6 to be relatively thin, and to have a lower element part declining in thickness towards its lower end so as to allow a belt to be bend when passing a pulley trajectory. Due to a tension within a set of rings the innermost ring at least the part thereof pressing a trajectory within a pulley is in stiff contact with the so called saddle part of an element, i.e. the lower element part of the spaces 13 and 14 for ring sets in the FIGS. 2 and 3 respectively.

Figure 5:
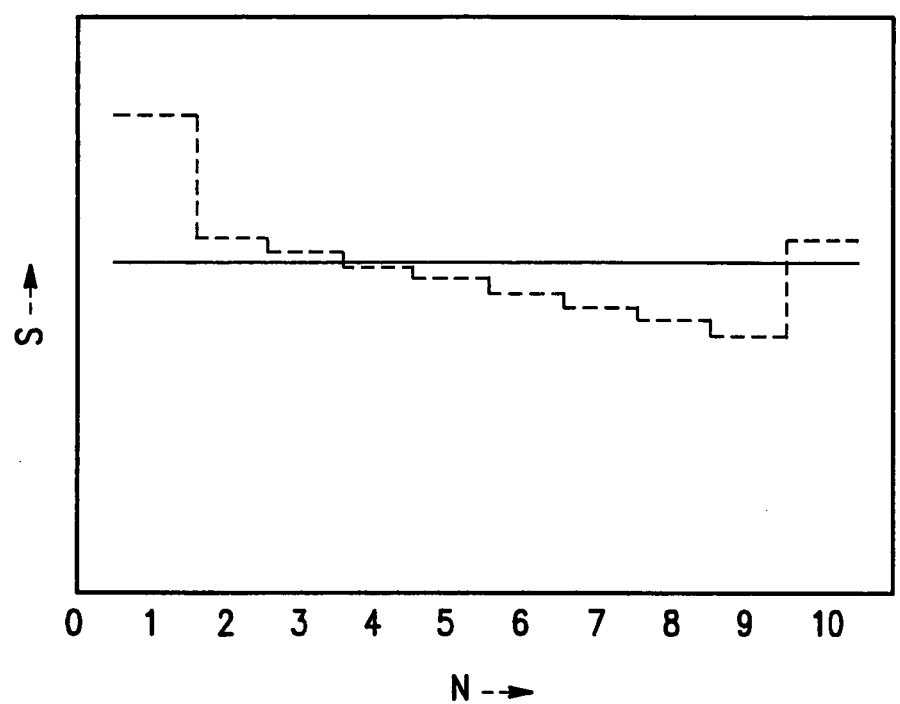
FIG. 5 is a plot indicating the level of tension for each ring in a set of rings of a belt, both for a belt according to prior art and for a belt according to the invention.

FIG. 5 is a figurative representation of the highest possible tension S occurring in any above mentioned parts or trajectories passed during operation of the belt, plotted for each ring N of a ring set, here provided with 10 rings. Number 1 in the plot stands for the innermost ring of the set, whereas No. 10 stands for the outermost ring. A similar plot can be made up for any number of rings in a set. The broken line in FIG. 5 represents a commercially available belt provided with practically no play, i.e. with at least some play between the rings. The solid line represents the tension in each ring of a belt according to the present invention in which the play between the ring has, as expressed in technical terms, a nominal value of zero. In common language this means that an inner ring of any pair of rings of a set may have some play relative to the outer ring, or may be somewhat longer than the inner diameter of the outer ring. In technical terms these states are denoted positive and negative play respectively. The notion nominal further includes that the average value of plays of a given number of pairs of rings is zero. In technical sense this zero value includes a certain margin. In the construction a favourable embodiment of the margin would be 0.00005 times the outer diameter of an inner ring of any pair of a set in each direction, i.e. plus or minus of the outer diameter.

The invention claimed is:

1. Belt (1) for use in a continuously variable transmission, comprising:
   at least one set (7) of nested metal rings (2),
   the rings (2) of the set (7) being accommodated with small mutual play between each pair of adjacent rings (2); and
   transverse elements (3, 6) provided slidably along the set (7), wherein,
   the set (7) interacts with the transverse elements (3, 6), and
   a thickness of at least an innermost ring (2) of the set (7) and an outermost ring of the set are each less than the thickness of in-between intermediate rings (2) of the set (7) intermediate the innermost ring (2) and the outermost ring of the set (7).

2. Belt (1) according to claim 1, wherein the thickness of said innermost ring (2) or said outermost ring (2) is at least twenty percent (20%) lower of the average value of the thickness of the in-between rings (2).

3. Belt (1) according to claim 1, wherein for at least the majority of said pairs of adjacent rings (2), a sum of positive amounts and negative amounts of play between said pairs of adjacent rings (2) is zero.

4. Belt (1) according to claim 1, wherein a nominal value of said. play is zero realized by a tolerance of 0.00005 times an outer diameter of the inner ring (2) of a relevant pair of rings (2), plus or minus of said diameter.

5. Belt (1) according to claim 1, wherein said mutual play between the innermost pair of adjacent rings (2) is of negative value.

6. Belt (1) according to claim 5, wherein the outer diameter of the innermost ring (2) is of a value 1−Z times the inner diameter of the adjacent ring, Z being of a value smaller than 0.0008.

7. Belt (1) according to claim 6, wherein Z is of a value greater than 0.0001.

8. Belt (1) according to claim 5, wherein the mutual play of an outermost pair of adjacent rings (2) is of positive value.

9. Belt (1) according to claim 8, wherein the inner diameter of the outermost ring (2) is of a value 1−Y times the outer diameter of the adjacent ring, Y being of a value smaller than 0.0004.

10. Belt (1) according to claim 9, wherein Y is of a value greater than 0.00005.

11. Belt (1) according to claim 1, wherein said mutual play of an outermost pair of adjacent rings (2) is of positive value.

12. Belt for use in a continuously variable transmission, comprising:
   a nested metal ring set comprising i) an innermost ring, ii) an outermost ring, and iii) intermediate rings located intermediate between the innermost ring and the outermost ring, mutual play being accommodated between each pair of adjacent rings; and
   transverse elements provided slidably along the ring set, wherein,
   the ring set interacts with the transverse elements, and
   a thickness of the innermost ring is less than the thickness of the intermediate rings,
   wherein the thickness of the innermost ring and the outermost ring are each less than the thickness of the intermediate rings.

13. The belt of claim 12, wherein, the thickness of the innermost ring and the thickness of the outermost ring are at least twenty percent less than an average value of the thickness of the intermediate rings.

14. The belt of claim 12, wherein, the thickness of the innermost is at least twenty percent less than an average value of the thickness of the intermediate rings.

15. The belt of claim 12, wherein, the outer diameter of the innermost ring is of a value 1−Z times the inner diameter of the adjacent ring, Z being of a value smaller than 0.0008.

16. The belt of claim 15, wherein, the Z is of a value greater than 0.0001.

17. The belt of claim 12, wherein, the inner diameter of the outermost ring is of a value 1+Y times the outer diameter of the adjacent ring, Y being of a value smaller than 0.0004.

18. The belt of claim 17, wherein, the Y is of a value greater than 0.00005.

* * * * *